United States Patent [19]

Wille

[11] Patent Number: 4,552,337

[45] Date of Patent: Nov. 12, 1985

[54] CARPENTER JACK

[76] Inventor: Allen R. Wille, 2207 Roosevelt Dr., Apt. 5, Anchorage, Ak. 99503

[21] Appl. No.: 595,832

[22] Filed: Apr. 2, 1984

[51] Int. Cl.[4] .................... B23P 19/02

[52] U.S. Cl. .................... 254/106

[58] Field of Search .................... 254/106-107, 254/105, 31

[56] References Cited

U.S. PATENT DOCUMENTS

| | | | |
|---|---|---|---|
| 2,255,261 | 9/1941 | Lucker | 254/106 |
| 2,718,253 | 9/1955 | Zinke | 254/106 |
| 3,091,432 | 5/1963 | Chartier | 254/106 |
| 3,727,291 | 4/1973 | Babb | 254/106 |

FOREIGN PATENT DOCUMENTS

| | | | |
|---|---|---|---|
| 433011 | 4/1948 | Italy | 254/106 |

*Primary Examiner*—Robert C. Watson

*Attorney, Agent, or Firm*—Williamson, Bains, Moore & Hansen

[57] ABSTRACT

A friction type carpenter jack has a carrier capable of movement upwardly when the inner surface of a jacking friction bar is capable of frictionally gripping the shaft. A downwardly jacking means also allows the carrier to move along the shaft toward a base plate. The downward movement is facilitated by a load holding friction bar being displaced angularly downwardly thereby having its inner surface of the shaft opening frictionally gripping the shaft. The carrier is rotatably mounted along the shaft and includes a plurality of holes for nail placement therethrough to secure a first workpiece. A head plate is also rotatable about the shaft and includes a plurality of openings for nail placement therethrough to secure a second workpiece. The jacking action of the carpenter jack permits the first workpiece to be moved toward the second workpiece for a variety of applications. The carpenter jack further includes a locking means for holding the carrier along the shaft in a stationary position.

11 Claims, 8 Drawing Figures

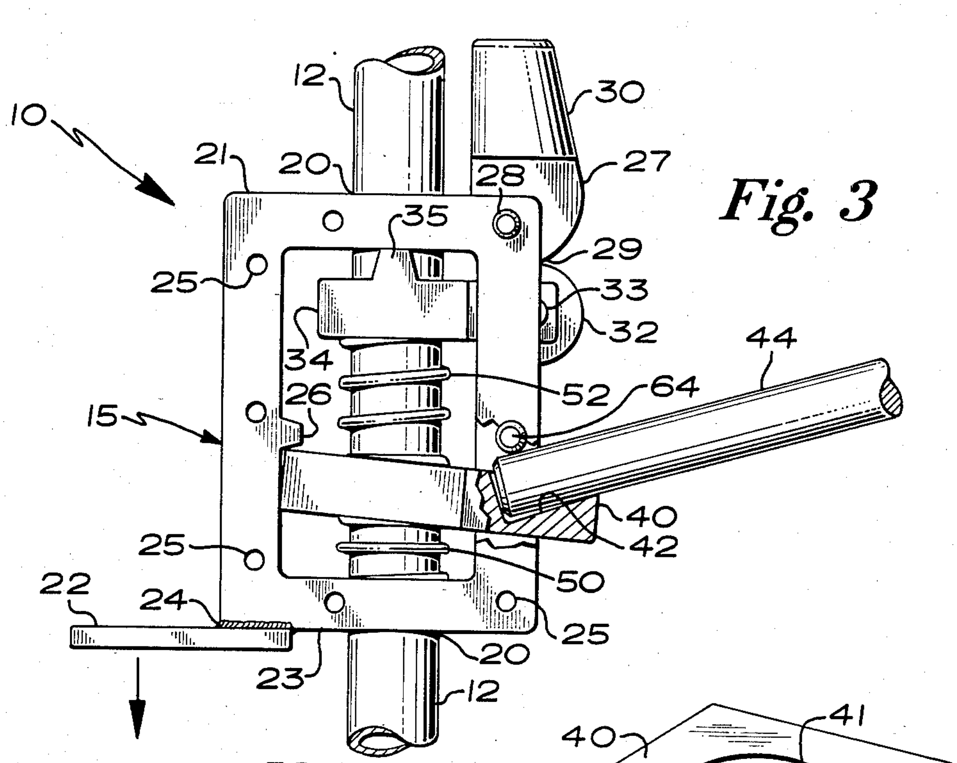
*Fig. 3*
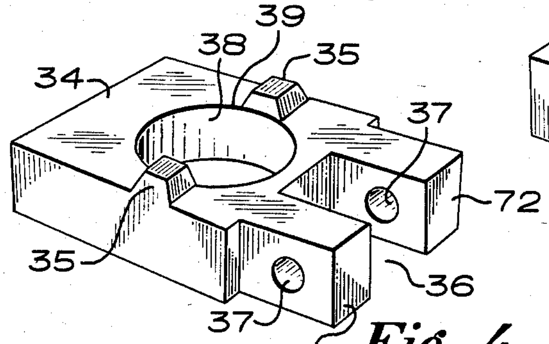
*Fig. 4*
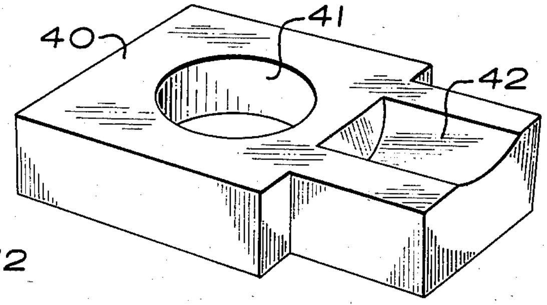
*Fig. 5*
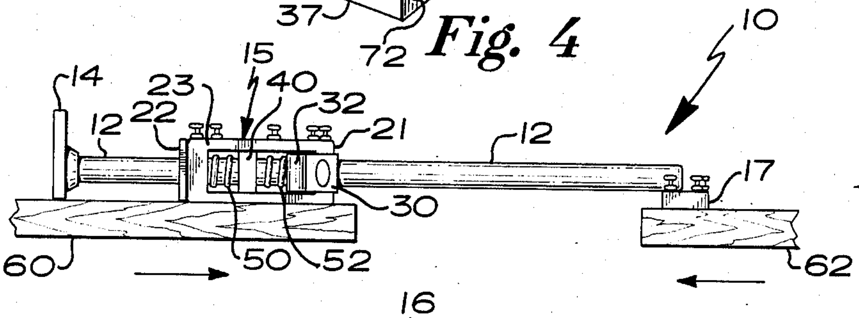
*Fig. 7*
*Fig. 8*
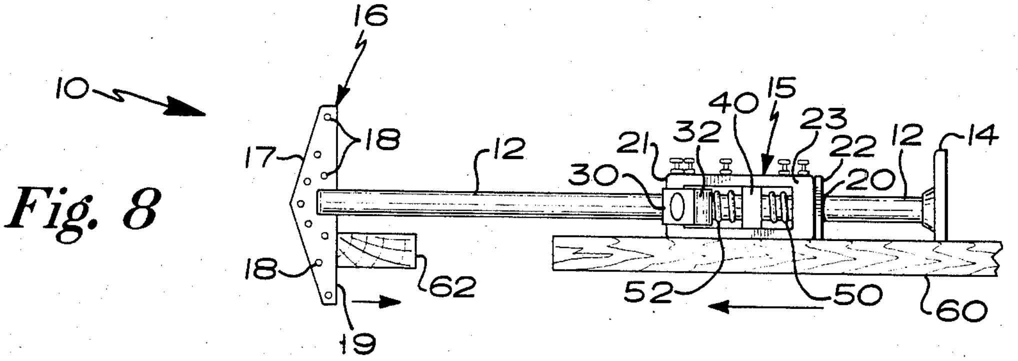

CARPENTER JACK

BACKGROUND OF THE INVENTION

The invention relates to the field of friction type carpenter jacks which can be used in a variety of applications and provides for an improved carpenter tool which can be used for lifting, pulling, pushing, and clamping.

The conventional, well known carpenter jacks are useful in many applications ranging from a friction type jack being used as a stump puller to use as a drill press. In most applications of a carpenter jack, it is desirable that the carpenter jack may be used for a variety of applications.

While friction type carpenter jacks are well known to the art, few carpenter jacks allow a first workpiece to be lifted, pulled, pushed, or clamped adjacent a second workpiece. U.S. Pat. No. 3,727,291 to Babb discloses a friction type jack wherein the mechanism of the jack is fixed to a press structure, and the cylindrical portion of the jack is used as a plunger for pressing objects together. The Babb device has the inherent problem in that it can only function as a press structure. The known friction type jack devices, including the Babb device, have generally limited application potential. For instance, U.S. Pat. No. 868,431 discloses a friction type jack used as a stump puller. U.S. Pat. No's. 269,267 to Hart and U.S. Pat. No. 2,720,125 disclose a friction type jack utilized as a drill press.

It is desirable to provide an improved friction type carpenter jack for lifting, pulling, pushing, and clamping a single workpiece or for performing these functions on multiple workpieces.

It has also been found desirable to provide an improved friction type carpenter jack having a head plate which is capable of retaining and securing a second workpiece so that the first workpiece may be aligned adjacent the second workpiece during use.

It has also been found desirable to provide a friction type carpenter jack wherein the workpieces may be secured with the carrier and head plate of the carpenter jack and thereby provide support when the multiple workpieces are lifted, pulled, or pushed adjacent one another.

It has also been found desirable to provide a friction type carpenter jack which has a plurality of apertures along the periphery of the carrier and head plate so that securing means may adequately retain and grasp the multiple workpieces during the various applications.

It has also been found desirable to provide a friction type carpenter jack which has a carrier and head plate, which are both engageable with the workpieces, rotatably mounted about the shaft of the carpenter jack so that the carpenter jack is capable of increased multiple applications.

It has also been found desirable to provide a friction type carpenter jack which is compact, easily and economically manufactured and which preferably allows the jacking handle to be retained within the carpenter jack assembly during transport.

The present invention is directed toward solving these problems and provides a workable and economical solution to them.

SUMMARY OF THE INVENTION

A friction type carpenter jack having a carrier which is capable of movement along a shaft. The carrier is rotatably mounted about the shaft. A base plate is provided engageable with the shaft and provides support for the carpenter jack if needed. A head plate is rotatably mounted along the shaft at the opposite end of the shaft from the base plate. The carrier has a retaining means extending outwardly from its lower section. The retaining means is capable of retaining and supporting a first workpiece during use. A plurality of holes extend through the carrier at spaced apart intervals. Nails may be placed through these holes and secure the first workpiece. The head plate also contains a plurality of apertures along its periphery. Nails may be placed through these apertures and imbed and engage the second workpiece. During use, the nails through the holes in the carrier and apertures in the head plate provide support when the first workpiece is moved toward the second workpiece.

The invention also utilizes a jacking friction bar which encircles the shaft and is capable of grasping the shaft. The jacking friction bar extends transversely through the carrier, and provides an upwardly jacking means for moving the carrier upwardly along the carrier. A roller is operatively connected to the jacking friction bar. The roller is in rotational engagement with a cam which is mounted to a lever arm. The lever arm is manually movable between a first and second position by means of an upper handle. As the upper handle is moved between the first and second positions, the jacking friction bar grips the shaft and the carrier moves upwardly along the shaft.

A downwardly jacking means is also provided. A load holding friction bar is positioned transversely through the carrier intermediate the lower section of the carrier and the jacking friction bar. The load holding friction bar permits movement of the carrier toward the base plate. The load holding friction bar includes a handle groove which receives the lower handle and allows the lower handle to be pumped between a first and second position thereby lowering the carrier along the shaft. A cylindrical member attached to the carrier aids in retaining the lower handle within the handle groove.

The invention also includes a locking means wherein the carrier is retained in a stationary position. This locking is accomplished by means of a ridge extending inwardly from the carrier. The ridge presses down on the end of the load holding friction bar thereby grabbing the shaft.

The invention further includes a first spring which encompasses the shaft and biases the load holding friction bar away from the lower section of the carrier. A second spring also encompasses said shaft and biases the load holding friction bar away from the jacking friction bar.

The rotation of head plate and carrier permits the carpenter jack to be used in a variety of applications. Since each application may require the first and second workpieces to be in a different starting arrangements,- the rotation of the carrier and head plate permits engagement with the first and second workpieces in a variety of starting arrangements.

Other objects and advantages of the invention will become apparent from the following detailed description and from the appended drawings in which like numbers have been used to describe like parts of the several views.

DESCRIPTION OF THE DRAWINGS

FIG. 3 is a front partially sectional view of the carpenter jack illustrating downwardly jacking;

FIG. 4 is a front perspective view of the jacking friction bar;

FIG. 5 is a front perspective view of the load holding friction bar;

FIG. 7 depicts the carpenter jack in a second application;

FIG. 8 depicts the carpenter jack in a third application.

DESCRIPTION OF THE PREFERRED EMBODIMENT

Figure 1:
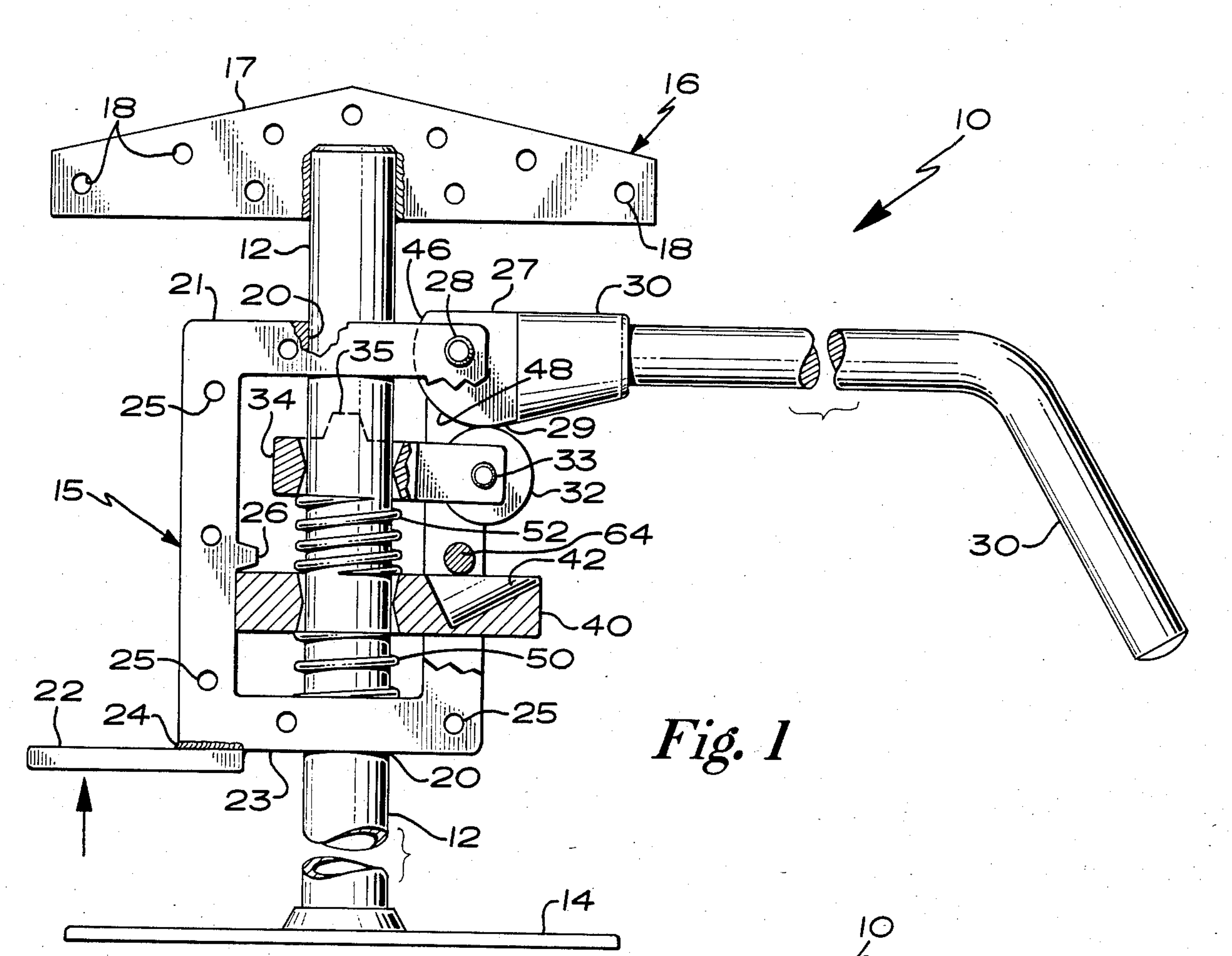
FIG. 1 is a front sectional view of the carpenter jack illustrating upward jacking.

Referring now to FIG. 1, a friction-type carpenter jack 10 has a main shaft 12 which is mounted to a base plate 14. The base plate 14 is also capable of supporting the shaft 12 and carpenter jack 10. At the opposite end of the shaft 12 from the base plate 14 is a head plate 16. The head plate 16 includes an upper surface 17 and a lower surface 19. A plurality of head plate openings 18 are drilled through the periphery of the head plate 18. The openings 18 permit nails to be placed therethrough which are capable of engaging and securing a second workpiece 62 as shown in FIG. 7. The head plate 16 is also capable of rotation about the shaft 12.

Figure 6:
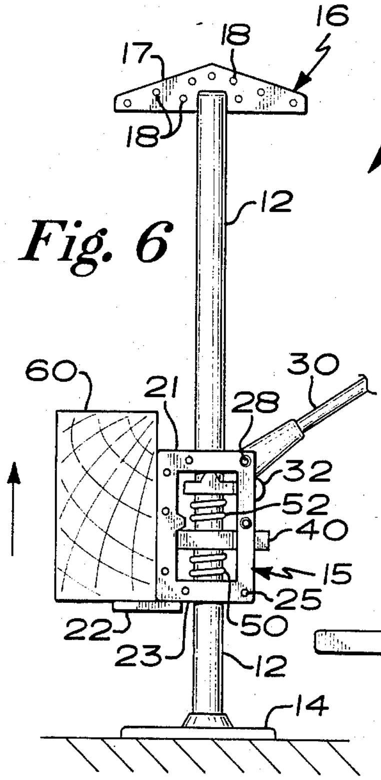
FIG. 6. depicts the carpenter jack in a first application.

A carrier 15 is rotatably mounted along the shaft 12 intermediate the base plate 14 and the head plate 16. The carrier 15 encompasses the shaft 12 at shaft openings located at points 20. The carrier 15 also includes an upper section or web member 21 and a lower section or web member 23. A flange 22 extends outwardly from the lower section 23 of the carrier 15 and provides for a retaining means in which the flange 22 is capable of retaining and supporting a first workpiece 60 as shown in FIG. 6. The flange 22 is welded to the lower section 23 along weld line 24.

A plurality of holes 25 are drilled through the carrier frame 15 at spaced apart intervals. The holes 25 permit nails to be placed therethrough which are capable of engaging and securing a first workpiece 60 as illustrated in FIG. 7. Preferably, the nails to be used are duplex 16D nails as this size nail facilitates secure construction and quick release. As shown in FIG. 7, the nails placed through the holes 25 of the carrier 15 and the nails placed through the openings 18 of the head plate 16 cooperate to secure and retain the first and second workpieces 60 and 62, respectively, as the first and second workpiece 60 and 62 are aligned adjacent one another during jacking, pulling, or lifting.

The weight of the carpenter jack assembly should be preferably about five pounds. The length of shaft 12 can be of any length, but the optimal length would be about 16 to 24 inches. The carpenter jack 10 has a maximum lifting capacity of approximately 1000 pounds.

As shown in FIG. 1 and 4, a jacking friction bar 34 encompasses the shaft 12 at shaft opening 38. A pair of abutments 35 extend upwardly from the jacking friction bar 34. At one end of the jacking friction bar 34 is a roller retaining notch 36. The roller retaining notch 36 is formed in between a pair of extensions 72 of the jacking friction bar 34. An opening 37 is drilled through each extension 72. As shown in FIG. 1, a roller 32 is positioned within the roller retaining notch 36. A roller pin 33 is placed through the cavity of the roller 32. The ends of the roller pin 33 are positioned within the openings 37 of the extensions 72 of the jacking friction bar 34. The roller 32 is capable of rotation about the roller pivot point or roller pin 33.

A cam retaining notch (not shown) is positioned upwardly of the roller retaining notch 36 along the upper section 21 of the carrier 15. A cam 27 is inserted within the cam retaining notch. The cam 27 is pivotable about cam pivot point or cam pin 28. The cam 27 is rotatably engageable with the roller 32 and meshes with the roller 32 at position 29. The cam 27 is operatively connected to an upper handle 30. The upper handle 30 is displaceable between a first and second position to thereby raise the carrier 15 upwardly along shaft 12. The operative communication between the upper handle 30 moving cam 27 thereby displacing roller 32 allows the inner surface 39 of the abutments 35 and shaft openings 38 of the jacking friction bar 34 to grip the shaft 12 and provide for an upwardly jacking means wherein the carrier 15 is moved upwardly along shaft 12.

Between the jacking friction bar 34 and the lower section 23 of the carrier 15 is a load holding friction bar 40 extending generally parallel to the jacking friction bar 34 through the carrier 15. The load holding friction bar 40 encompasses the shaft 12 at shaft openings 41 as shown in FIG. 5. At one end of the load holding friction bar 40, a trough 42 is milled therein. As shown in FIG. 3, the trough 42 allows a lower handle 44 to be placed therein. The lower handle 44 is also retained within the trough 42 by means of a cylindrical member 64 of the carrier 15 abutting the lower handle 44 when the lower handle 44 is placed in the trough 42. The lower handle 44 is displaceable between a first and second position upon manual jacking. The operative communication between the lower handle 44 being inserted in trough 42 and pryed against cylindrical member 64 provides for a downwardly jacking means so that the carrier 15 will move downwardly along shaft 12 by the shaft opening 41 grabbing the shaft 12.

Figure 2:
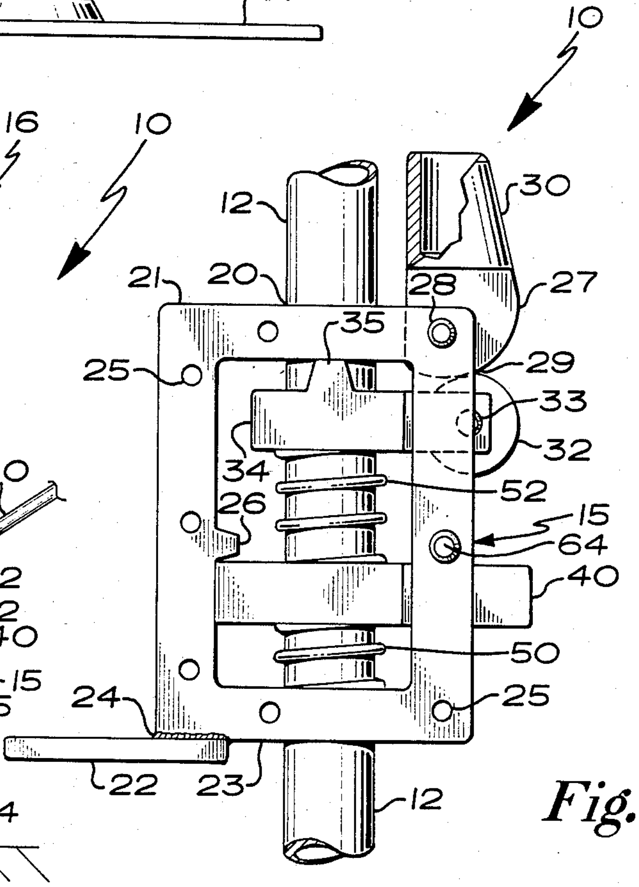
FIG. 2 is a front elevation view of the carpenter jack when locked.

A ridge 26 extends inwardly from the carrier 15 and abuts the load holding friction bar 40 when the bar 40 is in a stationary position. The cam 27 includes an inner diameter section 46 and an outer diameter section 48. The inner and outer diameter referred to are measured from the cam pivot point 28. When it is necessary to lock the carpenter jack 10, the upper handle 30 is positioned in a generally vertical arrangement as shown in FIG. 2. This causes the inner diameter 46 of the cam 27 to abut the roller and causes the abutment 35 of the jacking friction bar 34 to tightly abut the upper web member 21 under the biasing force of second spring 52. The abutment 35 being retained by the upper web member 21 cooperates with the ridge 26 retaining the load holding friction bar 40 to provide for a locking means wherein the carrier 15 is securely and reliably retained along shaft 12.

A first spring 50 biases the load holding friction bar 40 away from the lower web member 23 of the carrier 15. The second spring 52 biases the load holding friction bar 40 away from the jacking friction bar 34.

In operation, the first workpiece 60 and the second workpiece 62 are retained by the carpenter jack assembly 10 for a variety of applications as illustrated in FIGS. 6, 7, and 8. Referring now to FIG. 1 illustrating upwardly movement of carrier 15 along shaft 12, the upper handle 30 is pumped rapidly between a first and second position. The upper handle 30 is moved downwardly thus causing cam 27 to pivot about cam pin 28. The cam 27 rotatably engages roller 32 at position 29 and causes the jacking friction bar 34 to become depressed against the biasing force of second spring 52. Movement of the jacking friction bar 34 is restrained by the biasing force of second spring 52. When the handle 30 is moved downwardly and simultaneously the cam 27 engages the roller 32 and depresses the roller 32, the end of the jacking friction bar 34 opposite the roller 32 moves upwardly and the inner surface 39 of the abutments 35 and shaft opening 38 of the jacking friction bar 34 frictionally grips the shaft 12. This frictionally gripping action causes the unrestrained carrier 15 to move upwardly along shaft 12 toward the head plate 16.

FIG. 2 illustrates the locking position of the carpenter jack 10. The upper handle 30 is positioned in a generally vertical upright position. In this arrangement, the inner diameter section 46 of the cam 27 contacts roller 32. This forces abutment 35 of the jacking friction bar 34 to abut the upper web member 21 of the carrier 15 upon the biasing force of second spring 52. In the stationary position, the load holding friction bar 40 abuts the ridge 26 extending inwardly from the carrier 15 and the cylindrical member 64 upon the biasing force of first spring 50. The ridge 26 and cylindrical member 64 abutting the load holding friction bar 40 cooperates with the abutment 35 being retained by the upper web member 21 to lock the carrier 15 along shaft 12. This locking means permits a variety of applications to be undertaken, such as gluing.

The downwardly movement of the carrier 15 along shaft 12 is illustrated in FIG. 3. The lower handle 44 is inserted in the handle groove or trough 42 of the load holding friction bar 40. The cylindrical member 64 abuts and tightly retains the lower handle 44 in the trough 42 during jacking. As the lower handle 44 is rapidly pumped between a first and second position, the mid-portion of the load holding friction bar 40 angles downwardly under the biasing force of first spring 50. As the lower handle 44 moves downwardly, the sides of the shaft opening 41 of the load holding friction bar 40 (which is angled downwardly) frictionally grip the shaft 12. This action permits downwardly movement of the carrier 15 along shaft 12.

A few of the applications of this carpenter jack are shown in FIGS. 6, 7, and 8. In FIG. 6 a first workpiece 60 may be jacked upwardly. The first workpiece 60 is retained by the flange or retaining means 22 and the carrier 15. In this application, the base plate 14 is utilized to support the carpenter jack assembly 10.

In FIG. 7, the first workpiece 60 and the second workpiece 62 are to be moved toward one another. The carrier 15 is rotated about shaft 12 so that it is aligned generally parallel to the first workpiece 60. This permits nails to be driven through the holes 25 of the carrier 15 and be secured within the first workpiece 60. The head plate 16 is also rotated so that it is aligned generally parallel to the second workpiece 62. Nails are also driven through the head plate openings 18 to secure the second workpiece 62. Upon jacking, the first workpiece 60 may be moved toward the second workpiece 62.

In FIG. 8, the head plate 16 is rotated about shaft 12 so that the lower surface 19 of the head plate 16 abuts and retains the second workpiece. Upon jacking, the first workpiece 60 may be moved toward the second workpiece 62.

The carpenter jack disclosed herein is also capable of many other applications. These further applications include tube bending and use as a portable drill press.

In the preferred embodiment, the upper handle 30 and lower handle 44 are interchangeable as the same handle being retained by a cable suspended from the head plate. The upper handle 30 and lower handle 44 may also be conveniently stored in the hollow interior section of shaft 12.

While the preferred embodiments of the present invention have been described, it should be understood that various changes, adaptations, and modifications may be made therein without parting from the spirit of the invention and the scope of the appended claims.

What is claimed is:

1. A friction-type carpenter jack for jacking a first workpiece toward a second workpiece comprising:
   - a shaft;
   - a base plate engageable with said shaft and capable of providing support for the carpenter jack;
   - a carrier being rotatably mounted along said shaft and having an upper and lower section; said lower section having a first workpiece retaining means extending therefrom, said carrier also having a plurality of holes along its periphery for nail placement to secure the first workpiece during jacking;
   - an upwardly jacking means mounted on said carrier for movement of said carrier away from said base plate;
   - said upwardly jacking means including an upper handle displaceable between a first and second position;
   - a downwardly jacking means mounted on said carrier for movement of said carrier toward said base plate;
   - said downwardly jacking means including a lower handle displaceable between a first and second position;
   - a head plate engageable with said shaft and being rotatably mounted about said shaft on the opposite end of said shaft from said base plate, said head plate also including a plurality of openings for nail placement and holding of the second workpiece during jacking, said head plate further including a retaining surface capable of abutting the second workpiece; and
   - said carrier and said head plate cooperate with said upwardly jacking means permitting the first and second workpieces to be permanently aligned adjacent and in functional relationship to one another.

2. The friction type carpenter jack of claim 1 and further comprising:
   - said upwardly jacking means including a jacking friction bar which encircles said shaft and includes a roller retaining notch;
   - a roller being positioned within said roller retaining notch;
   - a cam in rotational engagement with said roller and mounted on said upwardly jacking means; and
   - said cam cooperates with said roller thereby causing said jacking friction bar to frictionally grip said shaft and move said carrier upwardly toward said head plate.

3. The friction type carpenter jack of claim 2 wherein:

said downwardly jacking means includes a load holding friction bar positioned transversely through said carrier, said load holding friction bar encircling said shaft and also having a handle groove for retention of said lower handle.

4. The friction type carpenter jack of claim 3 and further including:

a locking means wherein said load holding friction bar grabs said shaft retaining said carrier in a stationary position.

5. The friction type carpenter jack of claim 4 wherein:

said locking means includes a ridge on said carrier which presses down on the end of said load holding friction bar thereby grabbing said shaft.

6. The friction type friction bar of claim 3 wherein:

said load holding friction bar is positioned intermediate said jacking friction bar and said lower section of said carrier.

7. The friction type carpenter jack of claim 3 and further including:

a first spring encompassing said shaft and biasing said load holding friction bar away from said lower section of said carrier; and a second spring encompassing said shaft and biasing said load holding friction bar away from said jacking friction bar.

8. A friction-type carpenter jack for jacking a first workpiece toward a second workpiece comprising:

a shaft;

a base plate engageable with said shaft and capable of providing support for the carpenter jack;

a carrier being rotatably mounted along said shaft and having an upper and lower section; said lower section having a retaining means extending therefrom which is capable of engaging the first workpiece, said carrier also having a plurality of holes aligned along its periphery for nail placement to secure the first workpiece during jacking;

an upwardly jacking means mounted on said carrier for movement of said carrier away from said base plate;

said upwardly jacking means including an upper handle displaceable between a first and second position;

said upwardly jacking means including a jacking friction bar which encircles said shaft and includes a roller retaining notch;

a roller being positioned with said roller retaining notch;

a cam being operatively connected with said upper handle and in rotational engagement with said roller is mounted on said upwardly jacking means;

a downwardly jacking means mounted on said carrier for movement of said carrier toward said base plate;

said downwardly jacking means including a lower handle displaceable between a first and second position;

said downwardly jacking means also including a load holding friction bar positioned transversely through said carrier, said load holding friction bar encircling said shaft and also having a handle groove for retention of said lower handle;

a locking means retaining said carrier in a stationary position;

a head plate engageable with said shaft and being rotatably mounted about said shaft on the opposite end of said shaft from said base plate, said head plate also including a plurality of openings for nail placement to secure the second workpiece; and said holes of said carrier having nails driven therethrough into the first workpiece and said openings in said head plate having nails driven therethrough securing said second workpiece cooperate to enable the first workpiece to be moved toward the second workpiece for positional alignment.

9. The friction type carpenter jack of claim 8 and further including:

a first spring encompassing said shaft and biasing said load holding friction bar away from said lower section of said carrier; and a second spring encompassing said shaft and biasing said load holding friction bar away from said jacking friction bar.

10. The friction type carpenter jack of claim 8 and further including:

said locking means includes a ridge on said carrier which presses downwardly on the end of said load holding friction bar thereby grabbing said shaft.

11. The friction type carpenter jack of claim 10 and further including:

said cam includes an inner and outer diameter section, said inner diameter section contacts said roller when said upper handle is in a generally vertical position;

said jacking friction bar includes abutments extending upwardly therefrom, said abutments abutting said upper section of said carrier when said inner diameter section of said cam contacts said roller;

said inner diameter section of said cam forcing said abutment to abut said upper section of said carrier cooperates with said ridge pressing downwardly on said load holding friction bar to thereby lock said carrier in a stationary position along said shaft.

* * * * *